United States Patent
Martinello (10) Patent No.: US 11,556,098 B2
(45) Date of Patent: Jan. 17, 2023

(54) TRACKING CONDITIONS CONCERNING AN AREA TO AUTOMATICALLY GENERATE ARTIFICIAL INTELLIGENCE BASED RESPONSIVE ACTIONS

(71) Applicant: Ricoh Co., Ltd., Tokyo (JP)

(72) Inventor: Manuel Martinello, Mountain View, CA (US)

(73) Assignee: RICOH COMPANY, LTD., Tokyo (JP)

( * ) Notice: Subject to any disclaimer, the term of this patent is extended or adjusted under 35 U.S.C. 154(b) by 248 days.

(21) Appl. No.: 16/804,639

(22) Filed: Feb. 28, 2020

(65) Prior Publication Data
US 2021/0271210 A1  Sep. 2, 2021

(51) Int. Cl.
| | |
|---|---|
| G05B 13/02 | (2006.01) |
| G06N 20/00 | (2019.01) |
| G06N 5/04 | (2006.01) |
| G06N 7/00 | (2006.01) |
| H04L 12/28 | (2006.01) |

(Continued)

(52) U.S. Cl.
CPC ............ *G05B 13/028* (2013.01); *F24F 11/63* (2018.01); *G06N 5/04* (2013.01); *G06N 7/005* (2013.01); *G06N 20/00* (2019.01); *G07C 9/00896* (2013.01); *G08B 25/008* (2013.01); *H04L 12/282* (2013.01); *H05B 47/11* (2020.01); *H05B 47/115* (2020.01); *F24F 2120/10* (2018.01)

(58) Field of Classification Search
CPC ...... F24F 11/63; F24F 2120/10; G06N 20/00; G06N 5/04

USPC ........................................................ 700/276
See application file for complete search history.

(56) References Cited

U.S. PATENT DOCUMENTS 11,195,002 B2 * 12/2021 Roberts ................ H04N 5/3454
11,244,466 B2 *  2/2022 Dinh ...................... G06N 20/20
(Continued)

FOREIGN PATENT DOCUMENTS

| JP | 2008281241 A | 11/2008 |
| JP | 2013040693 A |  2/2013 |

(Continued)

OTHER PUBLICATIONS

Japanese Office Action for Application No. 2021-028953, dated Feb. 22, 2022, with English translation, 16 pgs.

*Primary Examiner* — Md Azad
(74) *Attorney, Agent, or Firm* — Patent Law Works LLP (57) ABSTRACT

Logical boundaries enclosing a physical area are defined. A segment of the logical boundaries is defined as a directional gate, wherein traversing the gate into the physical area is defined as an ingress and traversing the gate out of the physical area is defined as an egress. The directional gate is monitored, and ingresses and egresses are detected. An occupancy count of the physical area is maintained, based on monitoring the gate and detecting ingresses and egresses. One or more conditions are tracked in addition to the occupancy count. Artificial intelligence (AI) processing is applied to the maintained occupancy count and the additional tracked condition(s), in real-time as the monitoring, maintaining and tracking are occurring. One or more responsive actions are automatically taken as a result of applying the AI processing to the maintained occupancy count and the additional tracked condition(s).

19 Claims, 4 Drawing Sheets

(51) Int. Cl.
*G07C 9/00* (2020.01)
*H05B 47/115* (2020.01)
*H05B 47/11* (2020.01)
*F24F 11/63* (2018.01)
*G08B 25/00* (2006.01)
*F24F 120/10* (2018.01)

(56) References Cited

U.S. PATENT DOCUMENTS

| | | | |
|---|---|---|---|
| 2010/0262297 A1* | 10/2010 | Shloush | H05B 47/20 |
| | | | 348/135 |
| 2012/0062732 A1 | 3/2012 | Marman et al. | |
| 2012/0086780 A1 | 4/2012 | Sharma et al. | |
| 2015/0156031 A1* | 6/2015 | Fadell | G08B 29/185 |
| | | | 700/90 |
| 2015/0163626 A1 | 6/2015 | Zimmer | |
| 2016/0351031 A1 | 12/2016 | Jo et al. | |
| 2017/0026787 A1* | 1/2017 | Chow | G01S 5/0242 |
| 2017/0039728 A1 | 2/2017 | Bamba | |
| 2017/0169560 A1 | 6/2017 | Johansson | |
| 2017/0293807 A1* | 10/2017 | Mizes | G06K 9/6284 |
| 2018/0082140 A1 | 3/2018 | Ida et al. | |
| 2018/0181815 A1 | 6/2018 | Kanda et al. | |
| 2018/0276829 A1 | 9/2018 | Chang et al. | |
| 2019/0316801 A1* | 10/2019 | Dorna | G05B 15/02 |

FOREIGN PATENT DOCUMENTS

| | | |
|---|---|---|
| JP | 2015178915 A | 10/2015 |
| KR | 101875488 B1 | 7/2018 |

\* cited by examiner

TRACKING CONDITIONS CONCERNING AN AREA TO AUTOMATICALLY GENERATE ARTIFICIAL INTELLIGENCE BASED RESPONSIVE ACTIONS

TECHNICAL FIELD

This application generally relates to tracking occupancy and additional conditions of a physical area, and automatically generating artificial intelligence based responsive actions.

SUMMARY

The techniques introduced herein provide a method and system for defining logical boundaries enclosing a physical area, defining a segment of the logical boundaries as a directional gate, wherein traversing the gate into the physical area is defined as an ingress and traversing the gate out of the physical area is defined as an egress, monitoring the directional gate and detecting ingresses and egresses, maintaining an occupancy count of the physical area based on monitoring the gate and detecting ingresses and egresses, tracking at least one condition in addition to the occupancy count, applying artificial intelligence (AI) processing to the maintained occupancy count and the at least one additional tracked condition, in real-time as the monitoring, maintaining and tracking are occurring, and automatically taking at least one action as a result of applying the AI processing to the maintained occupancy count and the at least one additional tracked condition.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Described herein is a method, system and computer program product for tracking occupancy and additional conditions of a physical area, and automatically generating artificial intelligence based responsive actions. More specifically, logical boundaries enclosing a physical area are defined. The physical area can be, for example, a building, a room, a portion of a building or a room, an office, a specific area of floor space, an area containing or proximate to specific machinery or equipment, a storage area, etc. A segment of the logical boundaries is defined as a directional gate, such that traversing the gate into the physical area is defined as an ingress and traversing the gate out of the physical area is defined as an egress. In some implementations, multiple directional gates are defined. The directional gate is monitored, and ingresses and egresses are detected. The monitoring can be performed using one or more sensors, for example image sensors such as an ambient light sensor, an infrared sensor, a depth sensor, a thermal camera, etc. Based on these detected ingresses and/or egresses, an occupancy count of the physical area is maintained. One or more additional conditions are also tracked, such as time, noise, light, temperature, humidity, barometric pressure, spatial dimensions, etc.

Artificial intelligence (AI) processing is applied to the maintained occupancy count and additional tracked condition(s) in real-time, and one or more actions are automatically taken in response. This can take the form of detecting the occurrence of one or more specific triggers based on the maintained occupancy count and the one or more additional tracked conditions, by applying the AI processing. One or more corresponding actions can then be automatically taken in response to detecting the occurrence of the specific trigger(s). For example, it can be determined that the occupancy count of the physical area has exceeded or been equal to a specific threshold for a specific period of time, or has been at zero for a specific period of time. Examples of actions that may be taken in response include automatically adjusting a climate control system that controls temperature of the physical area, adjusting a lighting system that controls illumination of the physical area, automatically activating or deactivating a security system, turning a given piece of equipment on or off, limiting ingress or egress to/from the physical area, inputting data to a conference room management system, and outputting an electronic directive to a specific party (e.g., an administrator or manager). In addition, machine learning techniques can be applied to the tracked occurrences of triggers, the corresponding actions automatically taken, and the corresponding results of the actions automatically taken over the given period of time. In response to the results of applying the machine learning techniques, improved actions can be performed, such as creating new triggers, modifying existing triggers, modifying existing actions automatically taken corresponding to triggers, and creating new actions automatically taken corresponding to triggers. Statistics can also be complied concerning the tracked occurrences of triggers, the corresponding actions automatically taken, and the corresponding results of the actions automatically taken over given periods of time.

Figure 1:
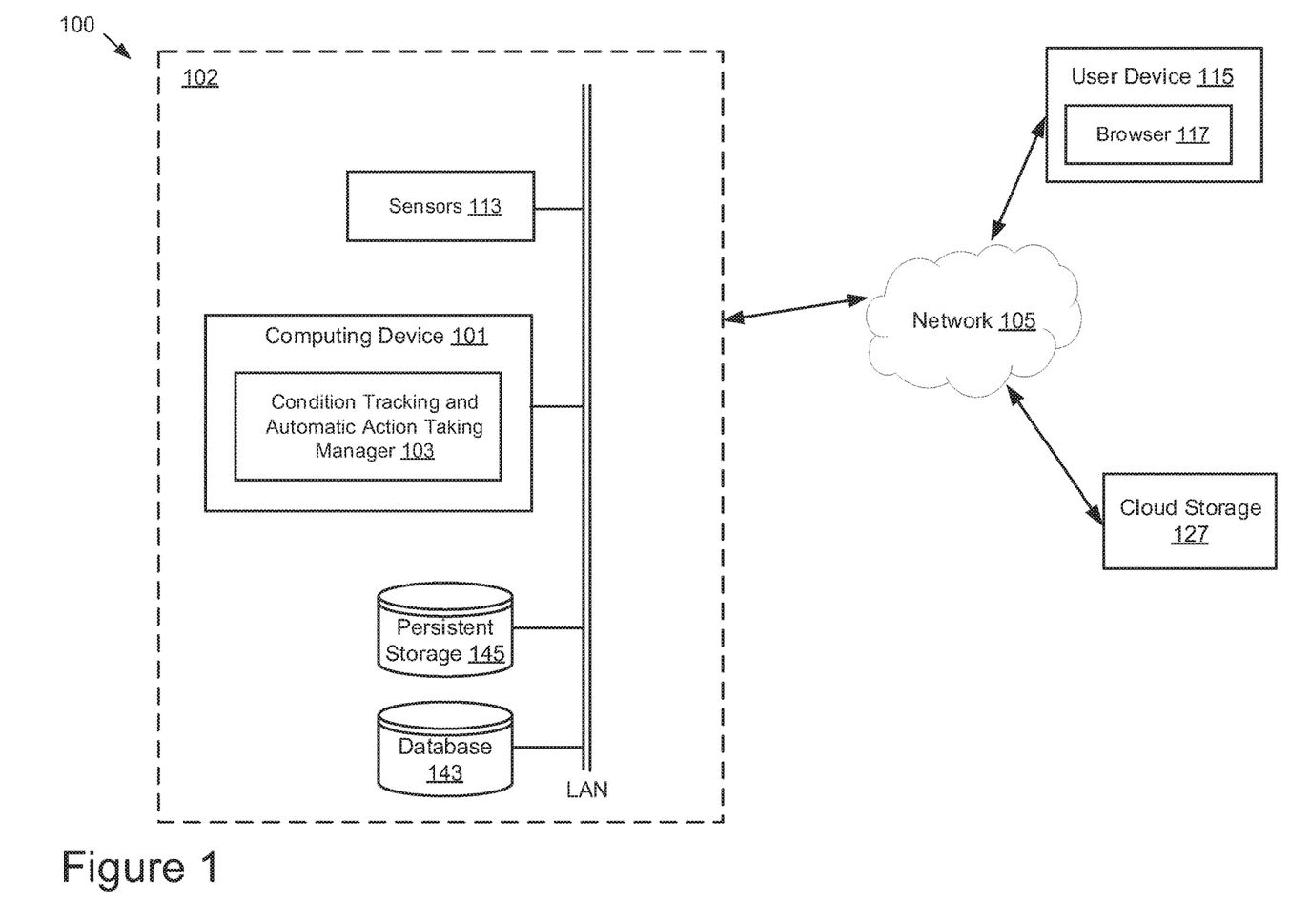
FIG. 1 depicts a high-level block diagram illustrating one implementation of a system for tracking occupancy and additional conditions of a physical area, and automatically generating artificial intelligence based responsive actions.

FIG. 1 depicts a high-level block diagram illustrating one implementation of a system 100 for tracking occupancy and additional conditions of a physical area, and automatically generating artificial intelligence based responsive actions. The illustrated system 100 includes a computing device 101, sensors 113, a database 143, and a persistent storage 145. In the illustrated implementation, the computing device 101, sensors 113, database 143, and persistent storage 145 may be connected in a local area network (LAN) and are further communicatively coupled to other entities of the system 100 via a network 105. In other implementations, the database 143 and/or the persistent storage 145 may be located remotely and coupled to other entities of the system 100 via the network 105. The system 100 may further include a user device 115 and cloud storage 127. The components of the system 100 are described in more detail below.

Although specific numbers of some components are shown in FIG. 1, it should be understood that there may be more or fewer of such components in different implementations. Also, such entities can be connected by any number of networks and/or LANs. Other components (not illustrated) may be connected in a similar manner. Conversely, all of the components illustrated in FIG. 1 need not be present. The components can be interconnected in different ways from that shown in FIG. 1.

The sensors 113 may be hardware devices that detect and respond to input from a physical environment. The sensors 113 may be coupled to the LAN and/or the network 105 to provide information or signals about the physical environment. One or more sensors 113, including for example a series of sensors, or a grid or array of sensors, may be located in different LANs and coupled to the network 105. The sensors 113 can be in the form of, for example, sensors capable of detecting the ingress/egress of directional gates, such as a motion sensor, a proximity sensor, a depth sensor, a video camera, a positioning sensor using, e.g., GPS, cellular, near field communications, video location, and other positioning techniques, etc. Other types of sensors may include, but are not limited to, an accelerometer, an ambient light sensor, a thermal sensor, an infrared sensor, a biometric sensor, a radio frequency detector, etc.

The computing device 101 may be in the form of a hardware or virtual device/server that performs the occupancy and additional condition tracking, and automatic generation of artificial intelligence based responsive actions described herein. The computing device 101 may include a condition tracking and automatic action taking manager 103 as illustrated in FIG. 1. In some implementations, the condition tracking and automatic action taking manager 103 is implemented using programmable or specialized hardware. In some implementations, the condition tracking and automatic action taking manager 103 is implemented using a combination of hardware and software. In other implementations, the condition tracking and automatic action taking manager 103 is instantiated as software stored and executed on the computing device 101.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include Bluetooth communication networks or a cellular communications network for sending and receiving data including short messaging service (SMS), multimedia messaging service (MMS), hypertext transfer protocol (HTTP), direct data connection, WAP, email, etc.

The user device 115 may be in the form of a computing device including a processor, a memory, applications, storage, network communication capabilities, etc. For example, the user device 115 can be a laptop computer, a desktop computer, a tablet computer, a smart phone, a wearable computing device, a personal digital assistant (PDA), a mobile email device, a television with one or more processors embedded therein or coupled thereto or any other form electronic device capable of running applications, accessing the network 105 and communicating with other components of system 100. In some implementations, the user device 115 includes a browser 117. The browser 117 is an application running on the user device 115 that locates, retrieves, and displays content for a user accessing the user device 115. In some implementations, the condition tracking and automatic action taking manager 103 automatically outputs electronic directive to a specific party operating the user device, e.g., via the browser. Such a directive may be output, for example, in response to the occurrence of the specific trigger.

Figure 2:
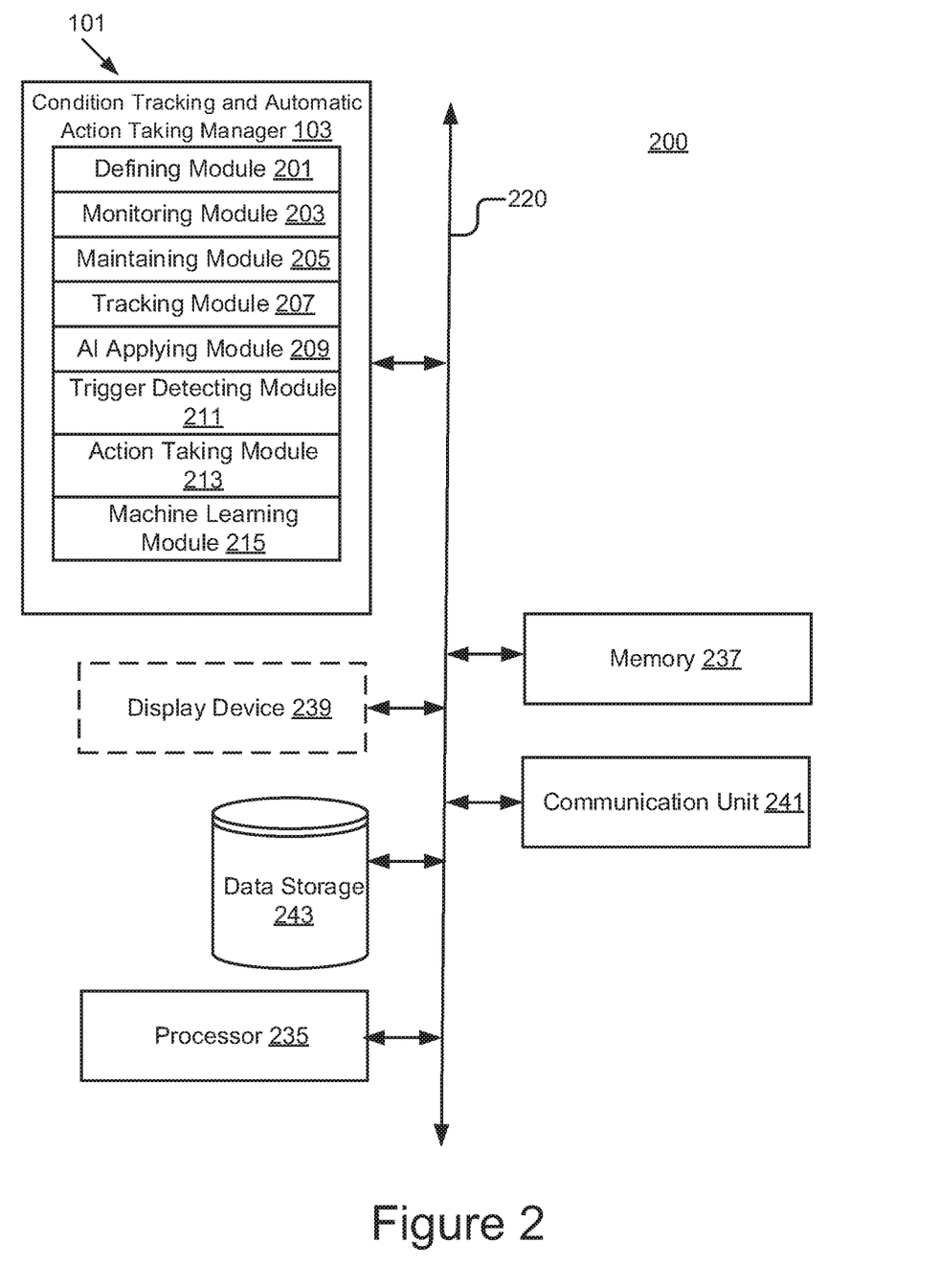
FIG. 2 depicts a block diagram illustrating one implementation of a computing device including a condition tracking and automatic action taking manager according to one implementation of the techniques described herein.

FIG. 2 depicts a block diagram illustrating one implementation of a computing device 101 including a condition tracking and automatic action taking manager 103. In some implementations, the computing device 101 is implemented as a system 200 which may also include a processor 235, a memory 237, an optional display device 239, a communication unit 241, and data storage 243 according to some examples. The components of the system 200 are communicatively coupled to a bus 220 for communication with each other.

The processor 235 may execute software instructions by performing various input/output, logical, and/or mathematical operations. The processor 235 may have various computing architectures to process data signals. The processor 235 may be physical and/or virtual and may include a single processing unit or a plurality of processing units and/or cores. In some implementations, the processor 235 may be capable of generating and providing electronic display signals to a display device, supporting the display of user interfaces used in receiving a user request for video content, identifying and providing the requested video content to a user, etc. In some implementations, the processor 235 may be coupled to the memory 237 via the bus 220 to access data and instructions therefrom and store data therein. The bus 220 may couple the processor 235 to the other components of the system 200 including, for example, the memory 237, the communication unit 241, the condition tracking and automatic action taking manager 103, and the data storage 243. It will be apparent to one skilled in the art that other processors, operating systems, and physical configurations are possible.

The memory 237 may store and provide access to data for the other components of the system 200. In some implementations, the memory 237 may store instructions and/or data that may be executed by the processor 235. The instructions and/or data may include code for performing the techniques described herein. For example, in one implementation, the memory 237 may store the condition tracking and automatic action taking manager 103. The memory 237 is also capable of storing other instructions and data, including, for example, an operating system, hardware drivers, other software applications, databases, etc. The memory 237 may be coupled to the bus 220 for communication with the processor 235 and the other components of the system 200.

The memory 237 may include one or more non-transitory computer-usable (e.g., readable, writeable) devices, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray, etc.), and/or other types of media, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 may be a liquid crystal display (LCD), light emitting diode (LED) or any other similarly equipped display device, screen or monitor. The display device 239 represents any device equipped to display user interfaces, electronic images and data as described herein. In different implementations, the display is binary (only two different values for pixels), monochrome (multiple shades of one color), or allows multiple colors and shades. The display device 239 is coupled to the bus 220 for communication with the processor 235 and the other components of the system 200. It should be noted that the display device 239 is shown in FIG. 2 with dashed lines to indicate it is optional. For example, the system 200 may be a server without a display device 239.

The communication unit 241 is hardware for receiving and transmitting data by linking the processor 235 to the network 105 and other processing systems. In one implementation, the communication unit 241 may include a port for direct physical connection to the network 105. In another implementation, the communication unit 241 may include a wireless transceiver (not shown) for exchanging data via network 105 using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated implementation, the data storage 243 is communicatively coupled to the bus 220 to receive data for storage and provide data for retrieval upon a request for the data.

The components of the condition tracking and automatic action taking manager 103 may include software and/or logic to provide the functionality they perform. In some implementations, the components can be implemented using programmable or specialized hardware including a field-programmable gate array (FPGA) or an application-specific integrated circuit (ASIC). In some implementations, the components can be implemented using a combination of hardware and software executable by the processor 235. In some implementations, the components are instructions executable by the processor 235. In some implementations, the components are stored in the memory 237 and are accessible and executable by the processor 235.

Figure 3:
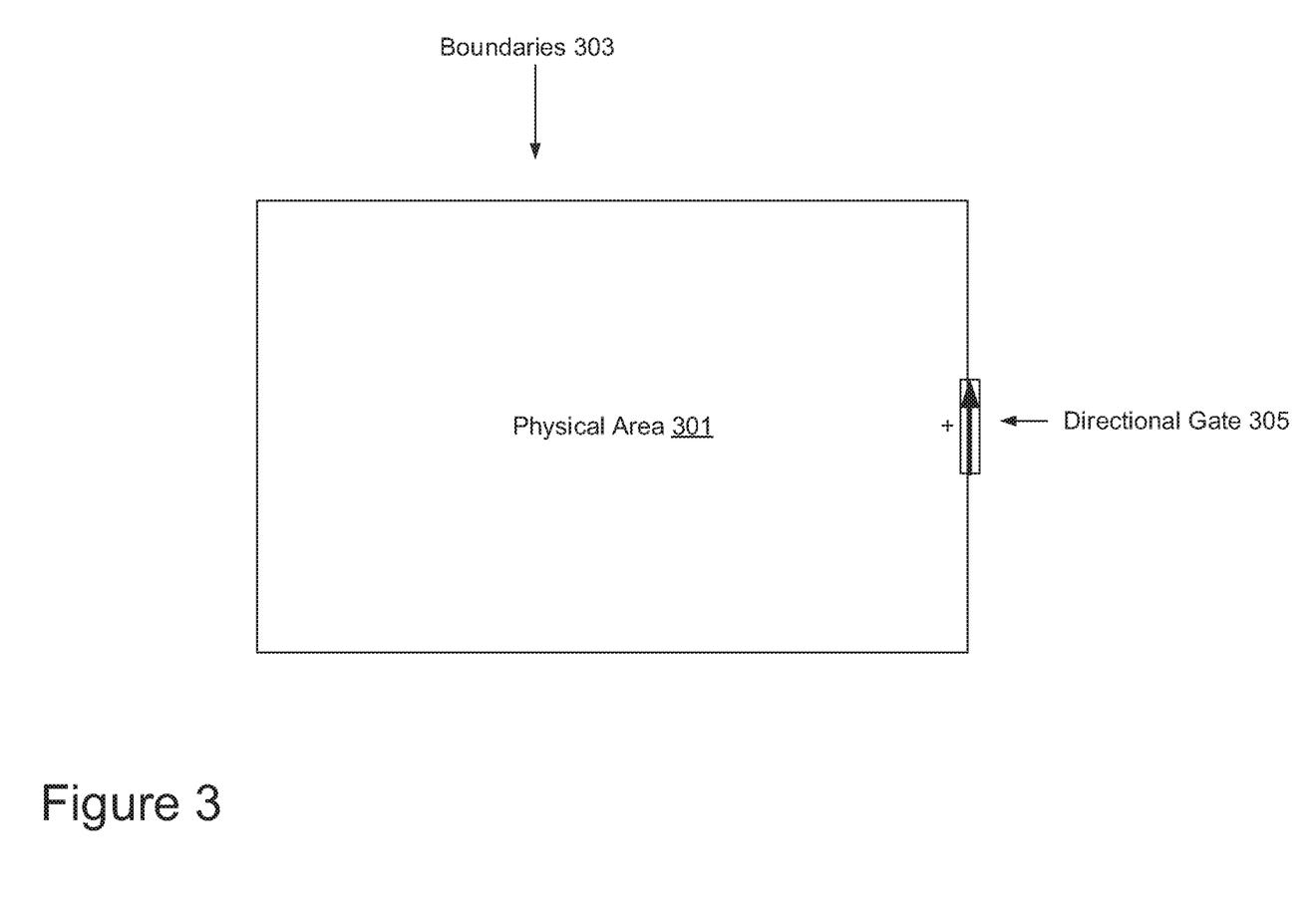
FIG. 3 depicts a block diagram illustrating the operation of a condition tracking and automatic action taking manager according to one implementation of the techniques described herein.

The defining module 201 may define the logical boundaries enclosing a physical area, such as a building, a room, a portion of a building, a portion of a room, an office, a specific area of floor space, an area containing or proximate to specific machinery or equipment, a storage area, etc. For example, FIG. 3 illustrates defined logical boundaries 303 enclosing a given physical area 301. It is to be understood that the defined logical boundaries 303 may correspond to actual physical boundaries such as walls (e.g., the walls of a room), or may simply be logical boundaries 303 defined in relation to a given physical area 301, such as logical boundaries virtually enclosing a given section of floor space in front of an HVAC unit, where none or only some of the defined boundaries correspond to actual physical ones.

The defining module 201 may further define one or more segments of the logical boundaries 303 as directional gates 305. A directional gate 305 may be defined such that traversing the gate 305 into the physical area 301 is defined as an ingress and traversing the gate out of the physical area is defined as an egress. A defined directional gate 305 may correspond to a door or other form of physical portal, or may correspond to a boundary segment that is logically defined as a directional gate 305 without corresponding to a specific physical portal.

The monitoring module 203 monitors the one or more directional gates 305, and detects ingresses to and egresses from the physical area 301. This monitoring can be implemented using various types of sensors 113 such as image sensors that can track or otherwise detect motion of people or other types of objects across a directional gate 305, for example a motion sensor, a proximity sensor, a depth sensor, a video camera, a positioning sensor using, e.g., GPS, cellular, near field communications, video location, and other positioning techniques, etc. In some implementations, the monitoring module 203 tracks people traversing the directional gate 305, for example people entering a conference room, office, building, or specific section of one of these types of areas. In other implementations, specific types of physical objects are tracked instead of or in additional to people. For example, the monitoring module 203 may monitor tools being removed from or returned to shelves, or boxes being removed from or placed in a storage closet.

The maintaining module 205 maintains an occupancy count of the physical area 301, based on monitoring the directional gate 305 and detecting ingresses and egresses. For example, where ingress and egress of people is being tracked, the maintaining module 205 maintains an occupancy count of the number of people in the physical area. To do so, the maintaining module 205 starts with a known initial occupancy count (determined, for example, by detecting the number of people in the room using image sensors). The maintaining module 205 may then increment the occupancy count whenever an ingress is detected, and decrement the occupancy count whenever an egress is detected. Where inanimate objects are being tracked, an initial inventory (e.g., of boxes, tools, etc.) is incremented and decremented based on the detection of ingresses and egresses.

The tracking module 207 tracks one or more conditions in addition to the occupancy count. Examples of such conditions are the noise level in the physical area, the level of light therein, the temperature, humidity, barometric pressure, spatial dimensions, etc. Temporal conditions can also be tracked, such an initial time (e.g., when a given condition occurs or a given type of monitoring begins) or an amount of time that has passed (e.g., since a given condition has been initially detected or a monitoring period began). It is to be understood that these are just some examples of conditions that can be tracked. Specific combinations of conditions can also be tracked as desired.

The AI applying module 209 applies AI processing to the maintained occupancy count and the one or more additional tracked condition(s), in real-time as the monitoring, maintaining and tracking are occurring. As an example of applying AI functionality, in some implementations the trigger detecting module 211 automatically detects the occurrence of one or more specific triggers based on the maintained occupancy count and the one or more additional tracked condition(s). For example, the trigger detecting module 211 can detect that the occupancy count of the physical area has been equal to a specific threshold (e.g., the conference room is now full), exceeds a threshold (e.g., there are too many people in the conference room), or has exceeded the threshold for a specific period of time (e.g., too many people have been in the conference room for over an hour). It is to be understood that the given thresholds and time periods to use in these scenarios are variable design parameters. Another example of a trigger is the occupancy count of a room becoming or being zero, in general or for a specific period of time. Other examples are a specific number of tools or boxes, or a specific tool or box, being removed from, returned to, remaining in, or being missing from a given physical area, e.g., for a specific period of time. Triggers can be based on specific occupancy count values or thresholds plus specific combinations of additional conditions, such as number of people exceeding a threshold in a physical space plus the temperature exceeding a threshold for a given period of time, or a given room being empty during a fire alarm or other emergency. These are just examples of triggers caused by corresponding combinations of conditions. Other combinations of conditions at any level of granularity can cause triggers as desired, as discussed in more detail below.

The action taking module 213 takes one or more actions as a result of applying the AI processing to the maintained occupancy count and the one or more additional tracked conditions. For example, the action taking module 213 can take such actions in response to detecting a given trigger or combination of triggers. Various actions are possible in this context. For example, a corresponding directive 317 can be displayed to one or more specific parties (e.g., inform a fire marshal or building manager that it is not necessary to evacuate check a given room during an emergency because it is known to be empty). Other examples of actions include but are not limited to automatically adjusting a climate control system that controls temperature of the physical area (e.g., in response to the occupancy count and current temperature both exceeding thresholds, or the physical space being empty), automatically adjusting a lighting system that controls illumination of the physical area (e.g., in response to the current occupancy count and illumination level), limiting ingress and/egresses from the physical area, automatically activating or deactivating a security system, turning a given piece of equipment on or off, etc. Another example action is automatically inputting data corresponding to the occurrence of the specific trigger to a conference room management system, for example to indicate that a reserved conference room is in fact empty, a room reserved for 30 people is being occupied by only two, etc. It is to be understood that individual triggers can be mapped to given actions, as can combinations of multiple specific triggers, at any desired level of granularity.

The tracking module 207 can also track the occurrences of triggers and/or other scenarios, the corresponding actions automatically taken in response, and detected results of these actions over time. The tracked occurrences of triggers, the corresponding actions taken, and the detected results can be input into the machine learning module 215. The machine learning module 215 can apply machine learning techniques to the input tracked occurrences of triggers, the corresponding actions automatically taken in response, and the corresponding results of the actions automatically taken over a given period of time. The machine learning can be used in this context to perform actions such as creating new triggers, modifying existing triggers, modifying existing actions automatically taken corresponding to one or more triggers, and creating new actions automatically taken corresponding to one or more triggers, at any level of granularity. In addition, statistics concerning this tracked information can be compiled at any level of granularity. Such statistics as well as the underlying tracked data may be stored in the database 143 and/or cloud storage 127. Compiled statistics and other information concerning this tracked data can be provided to users such as supervisors and managers. For example, this enables supervisors to know which triggers are detected over time, what actions are taken in response, and what the results of these actions are.

Figure 4:
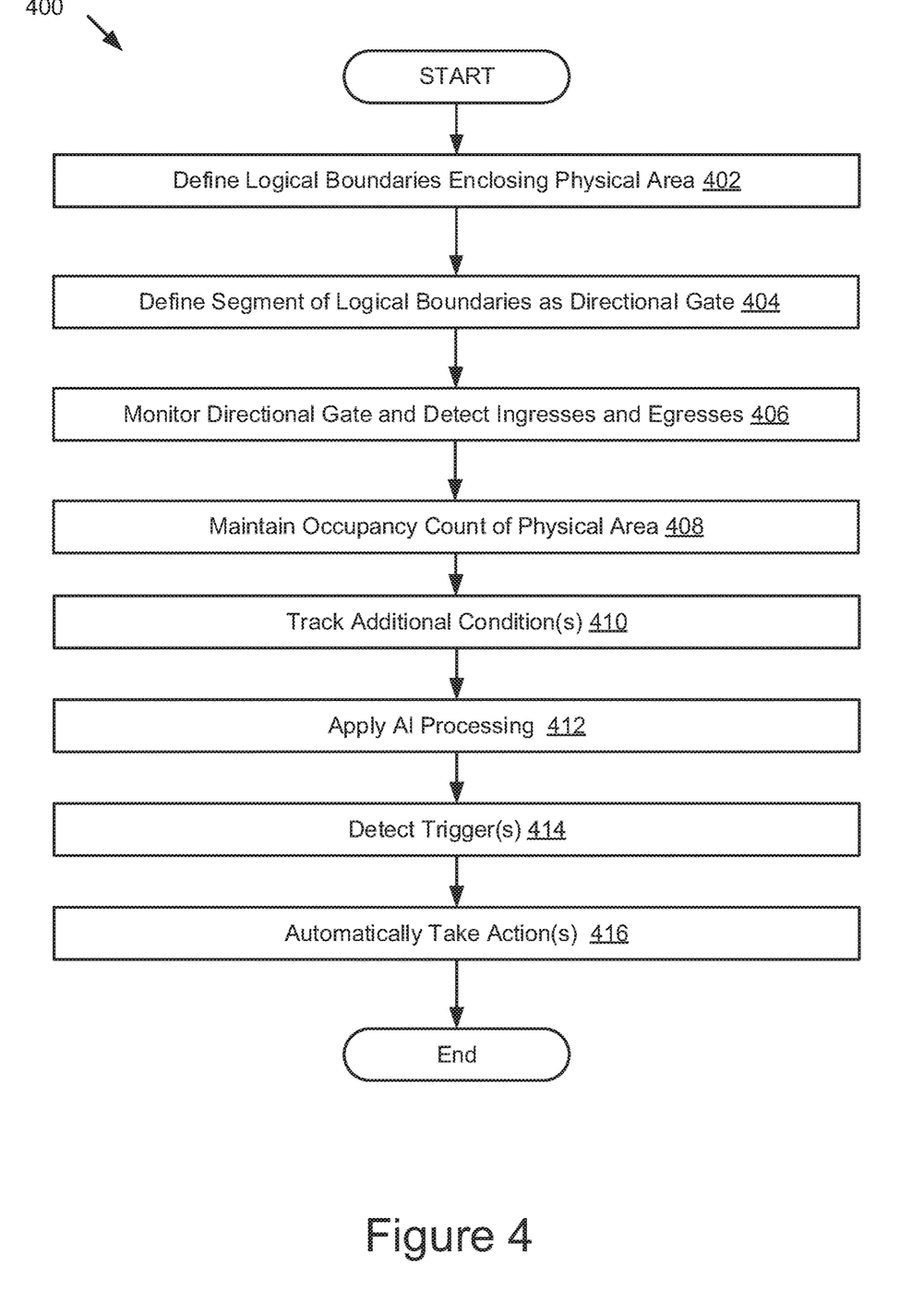
FIG. 4 depicts a flow diagram illustrating one implementation of a method for tracking occupancy and additional conditions of a physical area, and automatically generating artificial intelligence based responsive actions.

FIG. 4 depicts a flow diagram illustrating one implementation of a method 400 for tracking occupancy and additional conditions of a physical area, and automatically generating artificial intelligence based responsive actions. At 402, the defining module 201 may define logical boundaries 303 enclosing a physical area 301. At 404, the defining module 201 may define a segment of the logical boundaries 303 as a directional gate 305, such that traversing the gate 305 into the physical area 303 is defined as an ingress and traversing the gate 305 out of the physical area 305 is defined as an egress. At 406, the monitoring module 203 may monitor the directional gate 305 so as to detect ingresses and egresses. At 408, the maintaining module 205 may maintain an occupancy count of the physical area 301, based on monitoring the gate 305 and detecting ingresses and egresses. At 410, the tracking module 207 may track one or more conditions in addition to the occupancy count. At 412, the AI applying module 209 may apply AI processing to the maintained occupancy count and the one or more additional tracked conditions, in real-time. At 414, the trigger detecting module 211 may automatically detect an occurrence of one or more specific triggers, based on the maintained occupancy count and the one or more additional tracked conditions. At 416, the action taking module automatically takes one or more actions as a result of applying the AI processing to the maintained occupancy count and one or more additional tracked conditions.

A system and method for tracking occupancy and additional conditions of a physical area, and automatically generating artificial intelligence based responsive actions has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the present invention applies to any type of computing system that can receive data and commands, and present information as part of any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some implementations can take the form of an entirely hardware implementation, an entirely software implementation or an implementation containing both hardware and software elements. One implementation is implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various implementations as described herein.

The foregoing description of the implementations has been presented for the purposes of illustration and description. It is not intended to be exhaustive or to limit the specification to the precise form disclosed. Many modifications and variations are possible in light of the above teaching. It is intended that the scope of the implementations be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:
1. A computer-implemented method comprising:
   defining logical boundaries enclosing a physical area;
   defining a segment of the logical boundaries as a directional gate, wherein traversing the directional gate into the physical area is defined as an ingress and traversing the directional gate out of the physical area is defined as an egress;
   monitoring the directional gate and detecting ingresses and egresses;
   maintaining an occupancy count of the physical area based on monitoring the directional gate and detecting ingresses and egresses;
   tracking at least one condition in addition to the occupancy count;

applying artificial intelligence (AI) processing to the maintained occupancy count and the at least one additional tracked condition, in real-time as the monitoring, maintaining and tracking are occurring;

automatically detecting an occurrence of a specific trigger persisting for a specific period of time based on applying the AI processing to the maintained occupancy count and the at least one additional tracked environmental condition; and automatically taking at least one corresponding action in response to detecting the occurrence of the specific trigger persisting for the specific period of time.

2. The method of claim 1 further comprising:
defining at least one additional directional gate in the logical boundaries enclosing the physical area; and
monitoring the at least one additional directional gate and detecting ingresses and egresses.

3. The method of claim 1 further comprising:
monitoring one or more of the physical area the directional gate using at least one sensor from a group of sensors consisting of: an image sensor, an ambient light sensor, an infrared sensor, a depth sensor, a thermal camera, a motion sensor, a proximity sensor, a video camera and a positioning sensor.

4. The method of claim 1 wherein detecting ingresses and egresses further comprises:
detecting ingresses and egresses of people.

5. The method of claim 1 wherein detecting ingresses and egresses further comprises:
detecting ingresses and egresses of a specific type of object.

6. The method of claim 1 wherein tracking at least one condition in addition to the occupancy count further comprises:
tracking at least one condition from a group of conditions consisting of: time, noise, light, temperature, humidity, barometric pressure, and spatial dimensions.

7. The method of claim 1 wherein:
the physical area further consists of one from a group consisting of: a building, a room, a portion of a building, a portion of a room, an office, a specific area of floor space, an area containing or proximate to specific machinery or equipment and a storage area.

8. The method of claim 1 further comprising:
tracking multiple detected occurrences of triggers, multiple corresponding actions automatically taken in response, and multiple corresponding results of actions automatically taken, over a given period of time.

9. The method of claim 8 further comprising:
applying machine learning techniques to the tracked occurrences of triggers, the corresponding actions automatically taken, and the corresponding results of the actions automatically taken over the given period of time; and
in response to results of applying the machine learning techniques, performing at least one of the following actions: creating a new trigger, modifying an existing trigger, modifying an existing action automatically taken corresponding to at least one trigger, and creating a new action automatically taken corresponding to at least one trigger.

10. The method of claim 8 further comprising:
compiling statistics concerning the tracked occurrences of triggers, the corresponding actions automatically taken, and the corresponding results of the actions automatically taken over the given period of time.

11. The method of claim 1 wherein automatically detecting an occurrence of a specific trigger further comprises:
determining that the occupancy count of the physical area has exceeded a specific threshold for a specific period of time.

12. The method of 1 wherein automatically detecting an occurrence of a specific trigger further comprises:
determining that the occupancy count of the physical area has been zero for a specific period of time.

13. The method of 1 wherein automatically detecting an occurrence of a specific trigger further comprises:
determining that the occupancy count of the physical area has become equal to a specific threshold at a specific point in time.

14. The method of claim 1 wherein automatically taking at least one corresponding action in response to detecting the occurrence of the specific trigger further comprises:
automatically outputting an electronic directive to a specific party, the output directive corresponding to the occurrence of the specific trigger.

15. The method of claim 1 wherein automatically taking at least one corresponding action in response to detecting the occurrence of the specific trigger further comprises taking at least one step from a group of steps consisting of:
automatically adjusting a climate control system that controls temperature of the physical area;
automatically adjusting a lighting system that controls illumination of the physical area;
automatically activating or deactivating a security system;
automatically turning a given piece of equipment on or off;
limiting ingress to the physical area; and
limiting egress from the physical area.

16. The method of claim 1 wherein automatically taking at least one corresponding action in response to detecting the occurrence of the specific trigger further comprises:
automatically inputting data corresponding to the occurrence of the specific trigger to a conference room management system.

17. The method of claim 1 further comprising:
automatically detecting an occurrence of a combination of multiple specific triggers, based on the maintained occupancy count and the at least one additional tracked condition, by applying the AI processing; and
automatically taking at least one corresponding action in response to detecting the occurrence of the combination of the multiple specific triggers.

18. A computer program product comprising at least one non-transitory computer readable medium storing a computer readable program, wherein the computer readable program when executed on a computer causes the computer to:
define logical boundaries enclosing a physical area;
define a segment of the logical boundaries as a directional gate, wherein traversing the directional gate into the physical area is defined as an ingress and traversing the directional gate out of the physical area is defined as an egress;
monitor the directional gate and detect ingresses and egresses;
maintain an occupancy count of the physical area based on monitoring the directional gate and detecting ingresses and egresses;
track at least one condition in addition to the occupancy count;

apply artificial intelligence (AI) processing to the maintained occupancy count and the at least one additional tracked condition, in real-time;

automatically detect an occurrence of a specific trigger persisting for a specific period of time based on applying the AI processing to the maintained occupancy count and the at least one additional tracked environmental condition; and automatically take at least one action in response to detecting the occurrence of the specific trigger persisting for the specific period of time.

19. A system comprising:

at least one processor; and a memory, the memory storing instructions which when executed cause the at least one processor to:

define logical boundaries enclosing a physical area;

define a segment of the logical boundaries as a directional gate, wherein traversing the directional gate into the physical area is defined as an ingress and traversing the directional gate out of the physical area is defined as an egress;

monitor the directional gate and detect ingresses and egresses;

maintain an occupancy count of the physical area based on monitoring the directional gate and detecting ingresses and egresses;

track at least one condition in addition to the occupancy count;

apply artificial intelligence (AI) processing to the maintained occupancy count and the at least one additional tracked condition, in real-time;

automatically detect an occurrence of a specific trigger persisting for a specific period of time based on applying the AI processing to the maintained occupancy count and the at least one additional tracked environmental condition; and automatically take at least one action in response to detecting the occurrence of the specific trigger persisting for the specific period of time.

* * * * *